(12) United States Patent
Sproule, III et al.

(10) Patent No.: US 8,783,301 B2
(45) Date of Patent: Jul. 22, 2014

(54) WATER RESISTANT ADJUSTABLE JACKETS FOR INSULATED PIPE AND PIPE BENDS

(76) Inventors: Charles G. Sproule, III, Malvern, PA (US); George Bauer, Houston, TX (US)

( * ) Notice: Subject to any disclaimer, the term of this patent is extended or adjusted under 35 U.S.C. 154(b) by 599 days.

(21) Appl. No.: 13/037,672

(22) Filed: Mar. 1, 2011

(65) Prior Publication Data

US 2012/0211117 A1 Aug. 23, 2012

Related U.S. Application Data

(60) Provisional application No. 61/394,798, filed on Oct. 20, 2010.

(51) Int. Cl.
*F16L 9/14* (2006.01)

(52) U.S. Cl.
USPC ............................................. 138/149

(58) Field of Classification Search
USPC ................... 138/140, 149; 29/525.01
See application file for complete search history.

(56) References Cited

U.S. PATENT DOCUMENTS

| | | | |
|---|---|---|---|
| 1,871,508 A * | 8/1932 | Gardner .................. | 138/149 |
| 2,122,380 A | 6/1938 | Ragsdale et al. | |
| 2,841,203 A * | 7/1958 | Gronemeyer .............. | 138/109 |
| 2,981,072 A | 4/1961 | Brewington | |
| 3,055,399 A | 9/1962 | Bush et al. | |
| 3,102,740 A | 9/1963 | Plumer | |
| 3,153,546 A | 10/1964 | Dunn | |
| 3,161,210 A | 12/1964 | Loof | |
| 3,222,777 A * | 12/1965 | Rutter et al. ............... | 29/525.03 |
| 3,347,276 A | 10/1967 | Dunn | |
| 3,349,017 A * | 10/1967 | Ziegler .................... | 205/725 |
| 3,623,513 A | 11/1971 | Dinkelkamp | |
| 3,638,286 A * | 2/1972 | Eichberg .................. | 24/586.1 |
| 3,757,031 A | 9/1973 | Izraeli | |
| 3,858,282 A * | 1/1975 | Plummer .................. | 24/586.1 |
| 3,886,981 A | 6/1975 | Eliason | |
| 3,889,715 A * | 6/1975 | Lilja et al. ................ | 138/117 |
| 3,955,601 A * | 5/1976 | Plummer, III ............. | 138/149 |
| 3,983,905 A | 10/1976 | Witzig | |
| 4,054,985 A | 10/1977 | Aleniusson | |
| 4,164,243 A | 8/1979 | Cookson et al. | |
| 4,348,794 A | 9/1982 | Kim et al. | |
| 4,557,510 A | 12/1985 | Overmyer | |
| 4,647,713 A | 3/1987 | De Nijs et al. | |
| 4,669,509 A * | 6/1987 | Botsolas ................. | 138/178 |
| 4,682,568 A * | 7/1987 | Green et al. ............. | 122/235.14 |
| 4,840,201 A * | 6/1989 | Botsolas ................. | 138/178 |
| 4,850,397 A * | 7/1989 | Grenier .................. | 138/149 |
| D312,499 S | 11/1990 | Karakawa | |
| 5,020,481 A | 6/1991 | Nelson | |
| 5,022,685 A | 6/1991 | Stiskin et al. | |
| 5,727,599 A | 3/1998 | Fisher et al. | |

(Continued)

*Primary Examiner* — Paul R Durand
*Assistant Examiner* — Vishal Pancholi
(74) *Attorney, Agent, or Firm* — Volpe and Koenig, P.C.

(57) ABSTRACT

An adjustable jacket for an insulated conduit is provided, the adjustable includes inner and outer surface, first and second axial ends, and first and second longitudinal ends that each extends between the first and second axial ends. The first and second longitudinal ends form a longitudinal seal, which includes an outer seal formed by a terminal edge of one of the first and second longitudinal ends in contact with the outer surface of the adjustable jacket, and an inner seal formed by a terminal edge of another one of the first and second longitudinal ends in contact with the inner surface of the adjustable jacket.

20 Claims, 11 Drawing Sheets

(56) References Cited

U.S. PATENT DOCUMENTS

| | | |
|---|---|---|
| 5,775,379 A | 7/1998 | Manofsky |
| 5,797,415 A | 8/1998 | Nicholson et al. |
| 5,905,231 A | 5/1999 | Houte et al. |
| 6,034,329 A | 3/2000 | Kawamura |
| 6,078,009 A | 6/2000 | Kawamura |
| 6,182,706 B1 | 2/2001 | Tako et al. |
| 6,315,005 B1 | 11/2001 | Sproule, III |
| 6,382,260 B1 | 5/2002 | Sproule, III |

\* cited by examiner

WATER RESISTANT ADJUSTABLE JACKETS FOR INSULATED PIPE AND PIPE BENDS

CROSS REFERENCE TO RELATED APPLICATIONS

This application claims the benefit of U.S. Provisional Application No. 61/394,798, filed Oct. 20, 2010, which is incorporated by reference as if fully set forth herein.

FIELD OF INVENTION

This application is generally related to jackets for insulated conduits, and more particularly related to an adjustable jacket for an insulated conduit to prevent environmental factors from contacting the insulation and a method for applying an adjustable jacket around an insulated conduit.

BACKGROUND

Fluid transporting conduits, such as pipes or tubes, are widely used in many different industries and applications, and are often insulated to help maintain a desired temperature of the medium that is being transported. Industrial conduits, such as those used in the chemical, petrochemical, power, pump, and refinery fields are usually located outdoors and must be protected from water and other environmental factors. The penetration of liquid, such as water, precipitation, or moisture from the air into an insulation system can cause loss of insulating performance, damage to the insulation, or corrosion of the conduits. The loss of insulation property can also affect the contents of the conduit. For example, a vapor component of the conduit's contents may become condensed, i.e., the liquid transported by the conduit may freeze and disrupt the fluid flow within the conduit or rupture the conduit. This partially frozen liquid may also be transported through the conduit into processing equipment and adversely affect the operation of the equipment.

To prevent damage to the insulation, a jacket is usually applied around an insulated conduit to keep environmental factors from contacting the insulation. These jackets can be made of metal, such as aluminum and stainless steel, flexible or semi-rigid materials, such as thermoplastics, or any other suitable material. It is relatively easy to install water resistant jackets to straight lengths of insulated conduits by placing the overlap that forms the jacket's seal in a watershed position in order to direct water away from the area of the overlap. However, installing jackets, especially metal jackets, on fittings having angled elbows or T-configurations in a water resistant fashion has been problematic. It is difficult to conform the shape of the jacket to angled fittings covered with insulation because of the varying diameters of the pipe and the insulation covering the pipe. In practice, it is economically disadvantageous to produce pre-shaped jackets for covering pipes of various sizes having insulation of different thicknesses.

In order to address this problem, it has been known to form adjustable jackets having overlapping connecting flanges formed with inter-engageable ribs and grooves or pleats. For example, known adjustable jackets include a sliding and adjustable seal along the longitudinal edges of two semicircular pieces that join to form a jacket over a pipe bend or a straight length of pipe. Each of these semicircular pieces has a flange along its longitudinal edge designed to overlap with the flange of the opposing semicircular piece when both are placed around a pipe bend. The overlapping flanges are positioned so that the semicircular piece on the inside (contacting the insulation in the area of the overlap) is first positioned while the outside piece is then positioned onto the pipe so that the amount of overlap of the longitudinal edges of the outside piece with respect to the longitudinal edges of the inside piece can be increased or decreased in order to tighten or loosen the overall fit of the combined jacket onto the pipe bend. Each of the longitudinal edges of the inside piece has a semicircular raised ridge that faces the outside piece and runs longitudinally along the length of the flange. Each of the longitudinal edges of the outside piece is correspondingly shaped to include a tab formed by a flat strip of jacketing along the longitudinal edge that is slightly depressed with respect to the rest of the jacket. When the inside and outside pieces are properly positioned, the raised ridge of the inside piece rests on the conduit while the tab of the outside piece overlaps the raised ridge and rests flat against the outer surface of the inside piece.

While such known adjustable jackets are designed to be easily installable around pipe bends and to inhibit water or other moisture from entering the underlying insulation, it has been recognized that water or other environmental factors are able to breach the seals provided by the outer tab and the inside ridge. It is believed that this previous design can promote the entry of water or other environmental factors into the seam by creating unfavorable interfacial forces between water and the inside and outside pieces of the jacket. It is believed that the area in which the outside tab contacts the outer surface of the inside piece, which was designed to provide a first seal and primary barrier to water or moisture entry, facilitates the entry of liquid into the seam through a capillary effect. When in contact with liquid, the flat overlapping orientation of the outside tab with respect to the outer surface of the inside piece can provide boundary conditions between the outer edge of the seam and liquid droplets that favor formation of capillary pressure and subsequent capillary action, known as wicking. It is possible that the orientation of the outside tab increases the adhesive forces between the solid jacket and the liquid molecules. When these adhesive forces overcome the cohesive forces in a liquid droplet, which are provided, for example, by the intra-molecular forces between water molecules, the liquid droplet spreads across the surface in a process known as wetting. This increases the surface area of the interface between the liquid and the jacket, and subsequently increases the overall adhesive forces between the liquid and the solid jacket.

Once capillary pressure is formed between the outside tab and the outer surface of the inside piece, the capillary continues to draw in more liquid if a constant supply of new droplets are in contact with the boundary interface. This is likely in conditions such as a rainstorm. The liquid that accumulates in the area between the inside ridge and the outside tab then interfaces with the second seal provided by the contact between the top of the inside ridge and the inner surface of the outside piece. As the surface of the semi-circular ridge approaches the inner surface of the outer piece, the two solid surfaces approach a parallel orientation, which, in the presence of liquid, provides increased surface area and thus increased adhesive forces between the solid surfaces and the liquid. These conditions facilitate movement of the liquid beyond the seal by capillary action. Once this second seal is breached, the liquid can contact the insulation surrounding the conduit.

The insulation itself can also act as a strong wicking agent that facilitates further entrance of liquid inside the jacket. Furthermore, the low contact angles between the liquid and solid surfaces of the jacket, such as water that gathers in the area between the outside tab and the inside ridge, provides capillary adhesion in which water sticks between the two surfaces and draws them together. Therefore, even when a liquid is not being introduced to the boundary surfaces of the jacket, water or moisture from a previous rainstorm or condensation can be present in areas such as between the outside tab and the inside ridge. Although there may be no capillary motion, the trapped liquid can "prime" the interfacial forces for capillary action upon future contact with a liquid. This effect increases the likelihood of liquid breaching the seals through capillary action.

A need exists for an adjustable jacket that is easy to install, can be arranged around pipe bends, and prevents entry of liquid, such as water, moisture, and other environmental factors from entering the jacket, especially through capillary effects.

SUMMARY

An adjustable jacket for an insulated conduit is disclosed. The adjustable jacket includes inner and outer surfaces, first and second axial ends, and first and second longitudinal ends that each extends between the first and second axial ends. The first and second longitudinal ends form a longitudinal seal, which includes an outer seal and an inner seal. The outer seal is formed by a terminal edge of one of the first and second longitudinal ends in contact with the other surface of the adjustable jacket. The inner seal is formed by a terminal edge of another one of the first and second longitudinal ends in contact with the inner surface of the adjustable jacket.

An alternate embodiment of an adjustable jacket for an insulated conduit is also disclosed. The adjustable jacket includes inner and outer surfaces, a first section, and a second section. Each one of the first and second sections includes first and second axial ends, and first and second longitudinal ends that each extends between the first and second axial ends. The first longitudinal ends of the first and second sections form a first longitudinal seal and the second longitudinal ends of the first and second sections form a second longitudinal seal. The first longitudinal seal includes an outer seal formed by a terminal edge of one of the first longitudinal ends of the first and second sections in contact with the outer surface of the adjustable jacket, and an inner seal formed by a terminal edge of another one of the first longitudinal ends of the first and second sections in contact with the inner surface of the adjustable jacket. The second longitudinal seal similarly includes an outer seal formed by a terminal edge of one of the second longitudinal ends of the first and second sections in contact with the outer surface of the adjustable jacket, and an inner seal formed by a terminal edge of another one of the second longitudinal ends of the first and second sections in contact with the inner surface of the adjustable jacket.

Another alternate embodiment of an adjustable jacket for an insulated conduit is also disclosed. The adjustable jacket includes a plurality of axial jacket sections arranged adjacent to each other, each one of the plurality of axial jacket sections includes inner and outer surface, first and second axial ends, and first and second longitudinal ends that each extends between the first and second axial ends. The first and second longitudinal ends of each one of the plurality of axial jacket sections form a longitudinal seal. The second axial end of a first one of the plurality of axial jacket sections and the first axial end of an adjacent one of the plurality of axial jacket sections cooperate to form an axial seal. The axial seal includes an outer seal formed by a terminal edge of the second axial end of the first one of the plurality of axial jacket sections in contact with the outer surface of the adjacent one of the plurality of axial jacket sections, and an inner seal formed by a terminal edge of the first axial end of the adjacent one of the plurality of axial jacket sections in contact with the inner surface of the first one of the plurality of axial jacket sections.

A method of applying an adjustable jacket around an insulated conduit is also disclosed. The method includes the step of providing a first adjustable jacket comprising inner and outer surfaces, first and second axial ends, and first and second longitudinal ends that each extends between the first and second axial ends. Each one of the first and second longitudinal ends also includes a terminal edge formed as a flange arranged at an angle with respect to the inner and outer surfaces of the adjustable jacket. The method further includes the step of forming a longitudinal seal by overlapping the first and second longitudinal ends such that the terminal edge of one of the first and second longitudinal ends is in contact with the outer surface of the adjustable jacket to form an outer seal, and the terminal edge of another one of the first and second longitudinal ends is in contact with the inner surface of the adjustable jacket to form an inner seal. The longitudinal seal is then secured with a fastening element.

An alternate method of applying an adjustable jacket around an insulated conduit is also disclosed. The method includes the steps of providing an adjustable jacket having inner and outer surfaces, a first section, and a second section. Each one of the first and second sections includes first and second axial ends, and first and second longitudinal ends that each extends between the first and second axial ends and each includes a terminal edge formed as a flange arranged at an angle with respect to the inner and outer surfaces of the adjustable jacket. The method further includes the step of forming a first longitudinal seal by overlapping the first longitudinal ends of the first and second sections such that the terminal edge of one of the first longitudinal ends of the first and second sections is in contact with the outer surface of the adjustable jacket to form an outer seal, and the terminal edge of another one of the first longitudinal ends of the first and second sections is in contact with the inner surface of the adjustable jacket to form an inner seal. A second longitudinal seal is also formed by overlapping the second longitudinal ends of the first and second sections such that the terminal edge of one of the second longitudinal ends of the first and second sections is in contact with the outer surface of the adjustable jacket to form an outer seal, and the terminal edge of another one of the second longitudinal ends of the first and second sections is in contact with the inner surface of the adjustable jacket to form an inner seal. Finally, each one of the first and second longitudinal seals is secured with a fastening element.

For sake of brevity, this summary does not list all aspects of the present device, which are described in further detail below and in the appended claims.

BRIEF DESCRIPTION OF THE DRAWINGS

The foregoing summary, as well as the following detailed description of the preferred embodiments of the invention, will be better understood when read in conjunction with the appended drawings. For the purpose of illustrating the invention, there is shown in the drawings embodiments that are presently preferred. It should be understood, however, that the invention is not limited to the precise arrangements shown.

DETAILED DESCRIPTION OF THE PREFERRED EMBODIMENTS

Figure 1:
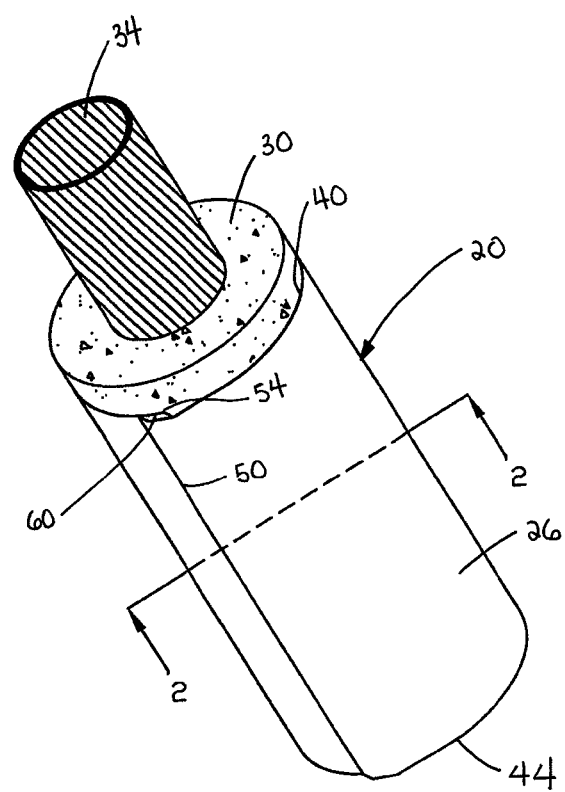
FIG. 1 is a perspective view of a section of an insulated conduit covered by an embodiment of the adjustable jacket.

Certain terminology is used in the following description for convenience only and is not limiting. The words "inner," "outer," "inwardly," and "outwardly" designates directions in the drawing to which reference is made. The terminology includes the words specifically noted above, derivatives thereof, and words of similar import.

Figure 2:
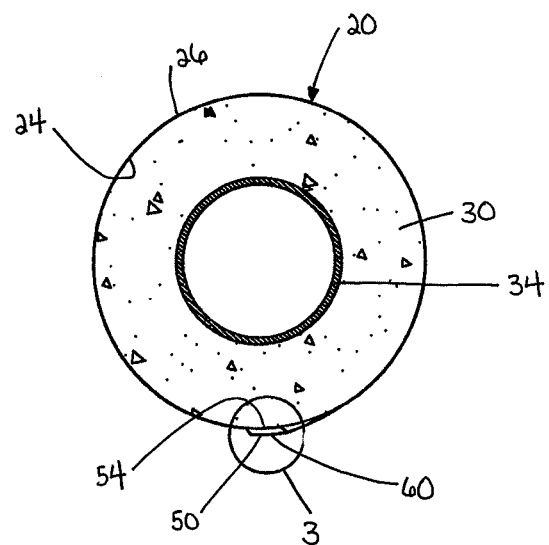
FIG. 2 is a cross sectional view taken along line 2-2 of FIG. 1.
Figure 3:
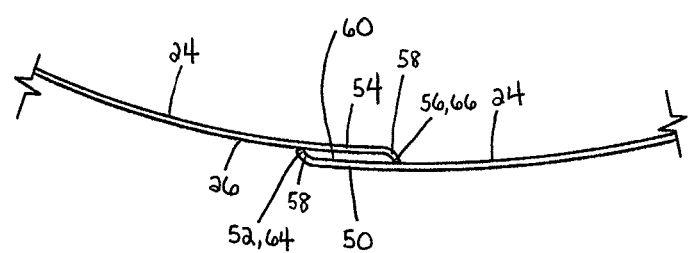
FIG. 3 is an enlarged detail view of the area circled in FIG. 2.

FIGS. 1-3 show one embodiment of the adjustable jacket 20 according to the present application. The adjustable jacket 20 is arranged around the insulation 30 of a conduit 34, such as a pipe, to protect the insulation 30 from penetration by a liquid, such as water, moisture, or other environmental factors. The adjustable jacket 20 includes inner and outer surfaces 24, 26, first and second axial ends 40, 44, and first and second longitudinal ends 50, 54 that each extends between the first and second axial ends 40, 44. The first and second longitudinal ends form a longitudinal seal 60 along the length of the adjustable jacket 20. As shown in FIG. 3, the longitudinal seal 60 includes an outer seal 64 formed by a terminal edge 52, 56 of one of the first and second longitudinal ends 50, 54 in contact with the outer surface 26 of the adjustable jacket 20, and an inner seal 66 formed by a terminal edge 52, 56 of another one of the first and second longitudinal ends 50, 54 in contact with the inner surface 24 of the adjustable jacket 20. The example illustrated in FIG. 3, shows the outer seal 64 formed by terminal edge 52 in contact with the outer surface 26 of the adjustable jacket 20 and the inner seal 66 formed by terminal edge 56 in contact with inner surface 24 of the adjustable jacket. The terminal edges 52, 56 of the first and second longitudinal ends 50, 54 can each be formed as a flange 58 arranged at an angle with respect to the inner and outer surfaces 24, 26 of the adjustable jacket 20. The size of the flanges 58 is relatively small, which maintains the solidarity of the jacket material and the strength along the bend radius between the terminal edges 52, 56 of the first and second longitudinal ends 50, 54 and the remainder of the jacket material. Given that the thickness of the jacket material is relatively small (for example and without limitation, approximately 0.024 inches), the force at the contact point of the outer and inner seals 64, 66 will be distributed over a small area, thus allowing for a tighter seal between each one of the terminal edges 52, 56 and a respective one of the inner and outer surfaces 24, 26. This tighter seal helps prevent liquid from breaching the longitudinal seal 60 and contacting the underlying insulation 30.

The angle at which the terminal edges 52, 56 of the first and second longitudinal ends 50, 54 contact the inner and outer surfaces 24, 26 of the adjustable jacket 20 to form the outer and inner seals 64, 66 also helps to prevent liquid from entering the longitudinal seal 60 through capillary action by altering the boundary conditions at the longitudinal seal 60 where contact with water is likely. The angle of the flanges 58 with respect to the inner and outer surfaces 24, 26 of the adjustable jacket 20 is preferably an acute angle or a substantially perpendicular angle. In a preferred configuration, the terminal edges 52, 56 of the first and second longitudinal ends 50, 54 contact the underlying or overlying surface at a substantially perpendicular angle. This steep angle of contact maintains higher water tension and deters capillary action. Because the outer and inner seals 64, 66 are formed by substantially perpendicular contact between the terminal edges 52, 56 of the first and second longitudinal ends 50, 54 and the inner and outer surfaces 24, 26 of the adjustable jacket, the surface area and adhesive forces between the liquid, such as water or moisture, and the jacket are minimized, while the cohesive forces within the liquid droplet maintains the spherical shape of the droplet and minimizes its area. The longitudinal seal 60 of the present adjustable jacket 20 is easily formed, allows for a sliding adjustment to accommodate insulated conduits of various sizes, provides stronger and more focused points of contact at the outer and inner seals 64, 66, and promotes non-wetting boundary conditions that deter capillary action.

As shown in FIG. 3, the adjustable jacket 20 can be configured such that the outer seal 64 is formed by the terminal edge 52 of the first longitudinal end 50, which is arranged substantially perpendicular to the outer surface 26 of the adjustable jacket 20, and the inner seal 66 is formed by the terminal edge 56 of the second longitudinal end 54, which is arranged substantially perpendicular to the inner surface 24 of the adjustable jacket 20. Alternatively, the configuration can be switched so that the outer seal 64 is formed by the terminal edge 56 of the second longitudinal end 54 and the inner seal 66 is formed by the terminal edge 52 of the first longitudinal end 50. The terminal edge 56 of the second longitudinal end 54 being arranged substantially perpendicular to the outer surface 26 of the adjustable jacket 20, and the terminal edge 52 of the first longitudinal end 50 being arranged substantially perpendicular to the inner surface 24 of the adjustable jacket 20. The present adjustable jacket 20 is further advantageous over known jacketing systems because the peripheral direction of the terminal edge 52, 56 at the inner seal 66 prevents the adjustable jacket 20 from snagging or digging into the underlying insulation 30 during installation. Known jacketing systems generally use a straight or inner facing leading edge, which is prone to snagging and digging into the insulation, thus making the jacketing system difficult to install.

Figure 4:
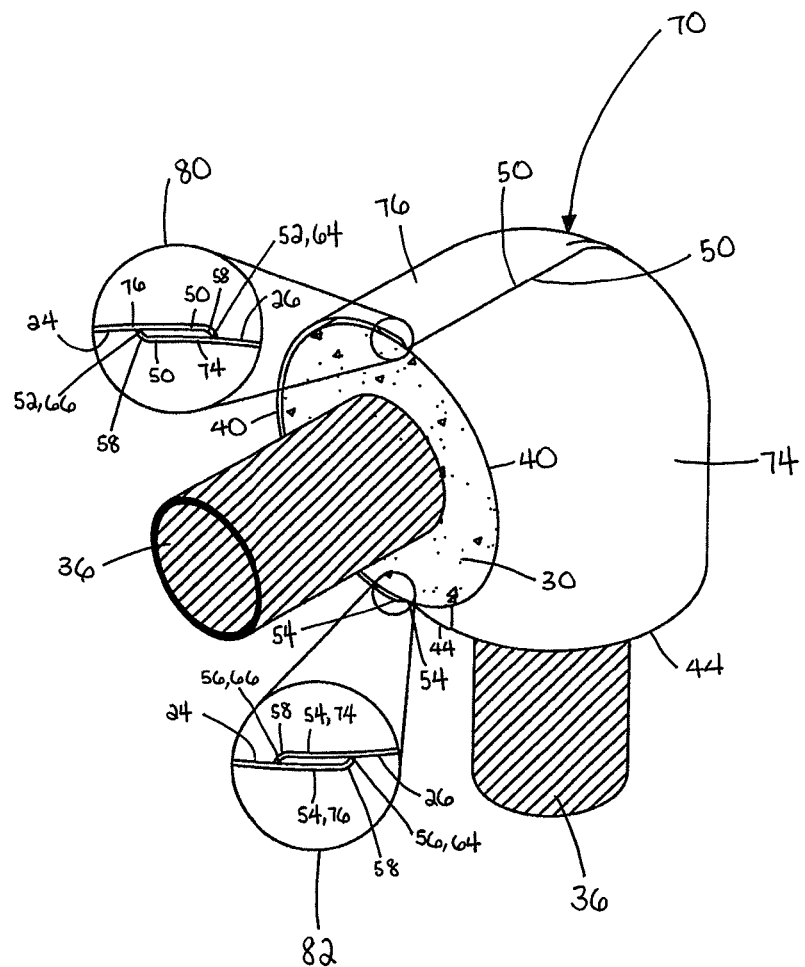
FIG. 4 is a perspective view of a section of an insulated conduit bend covered by an alternate embodiment of the adjustable jacket, with enlarged detail views of the seals of the adjustable jacket.

FIG. 4 shows an alternate embodiment of an adjustable jacket 70 according to the present application. The adjustable jacket 70 is arranged over a pipe bend 36 covered by insulation 30. While FIG. 4 shows the pipe bend 36 to be a 90-degree bend, one of ordinary skill in the art would appreciate that the present adjustable jacket 70 can be used with straight pipe sections and various types of pipe bends including, but not limited to, 90-degree and 45-degree elbows, T-configurations, flanges, and valves. The adjustable jacket 70 includes inner and outer surfaces 24, 26, a first section 74, and a second section 76. Each one of the first and second sections 74, 76 includes first and second axial ends 40, 44 and first and second longitudinal ends 50, 54 that each extends between the first and second axial ends 40, 44. The first longitudinal ends 50 of the first and second sections 74, 76 form a first longitudinal seal 80 and the second longitudinal ends 54 of the first and second sections 74, 76 form a second longitudinal seal 82. As shown in the enlarged detail views of the first and second longitudinal seals 80, 82 in FIG. 4, the first longitudinal seal 80 includes an outer seal 64 formed by a terminal edge 52 of one of the first longitudinal ends 50 of the first and second sections 74, 76 in contact with the outer surface 26 of the adjustable jacket 70, and an inner seal 66 formed by a terminal edge 52 of another one of the first longitudinal ends 50 of the first and second sections 74, 76 in contact with the inner surface 24 of the adjustable jacket 70. The second longitudinal seal 82 similarly includes an outer seal 64 formed by a terminal edge 56 of one of the second longitudinal ends 54 of the first and second sections 74, 76 in contact with the outer surface 26 of the adjustable jacket 70, and an inner seal 66 formed by a terminal edge 56 of another one of the second longitudinal ends 54 of the first and second sections 74, 76 in contact with the inner surface 24 of the adjustable jacket 70. The terminal edges 52, 56 of the first and second longitudinal ends 50, 54 of the first and second sections 74, 76 can each be formed as a flange 58 arranged at an angle with respect to respective ones of the inner and outer surfaces 24, 26 of the adjustable jacket 70. As discussed above with respect to FIGS. 1-3, the angle of the flanges 58 is preferably acute or substantially perpendicular to the inner and outer surfaces 24, 26 of the adjustable jacket 70, which provides a strong and focused point of contact to form a seal that deters capillary action and prevents water from entering the adjustable jacket 70.

Preferably, the first section 74 of the adjustable jacket 70 is configured so that the terminal edges 52, 56 of its first and second longitudinal ends 50, 54 are formed as flanges 58 that protrude outwardly away from the center of the adjustable jacket 70, as shown in FIG. 4. During assembly of the adjustable jacket 70 over the insulation 30 of the pipe bend 36, the first section 74 is placed over the insulation 30 first. As discussed above, the formation of the flanges 58 facing away from the center of the adjustable jacket 70 prevents the first section 74 from snagging or digging into the underlying insulation 30. The second section 76 of the adjustable jacket 70 is configured so that the terminal edges 52, 56 of its first and second longitudinal ends 50, 54 are formed as flanges 58 that protrude inwardly towards the center of the adjustable jacket 70. After the first section 74 is placed, the second section 76 is placed over the first section 74 so that the terminal edges 52, 56 of the first and second longitudinal ends 50, 54 of the second section 76 overlaps the terminal edges 52, 56 of the first and second longitudinal ends 50, 54 of the first section 74 to form the outer seals 64 of the first and second longitudinal seals 80, 82. The amount of overlap between the second section 76 and the first section 74 can be increased or decreased to tighten or adjust the fit of the adjustable jacket 70 around the insulation 30 of the pipe bend 36, thus maintaining a sliding seam that can be adjusted to properly fit the unique properties of the particular insulated pipe bend. This configuration of the terminal edges 52, 56 of the first and second longitudinal ends 50, 54 of the first and second sections 74, 76 is further advantageous during installation by keeping the first and second sections 74, 76 in place before being secured. If the second section 76 begins to slide off after it is placed over the first section 74, the terminal edges 52, 56 of the first and second longitudinal ends 50, 54 of the second section 76 would catch on the opposing terminal edges 52, 56 of the first and second longitudinal ends 50, 54 of the first section 74, thus preventing the adjustable jacket 70 from falling off of the pipe bend 36.

Figure 5:
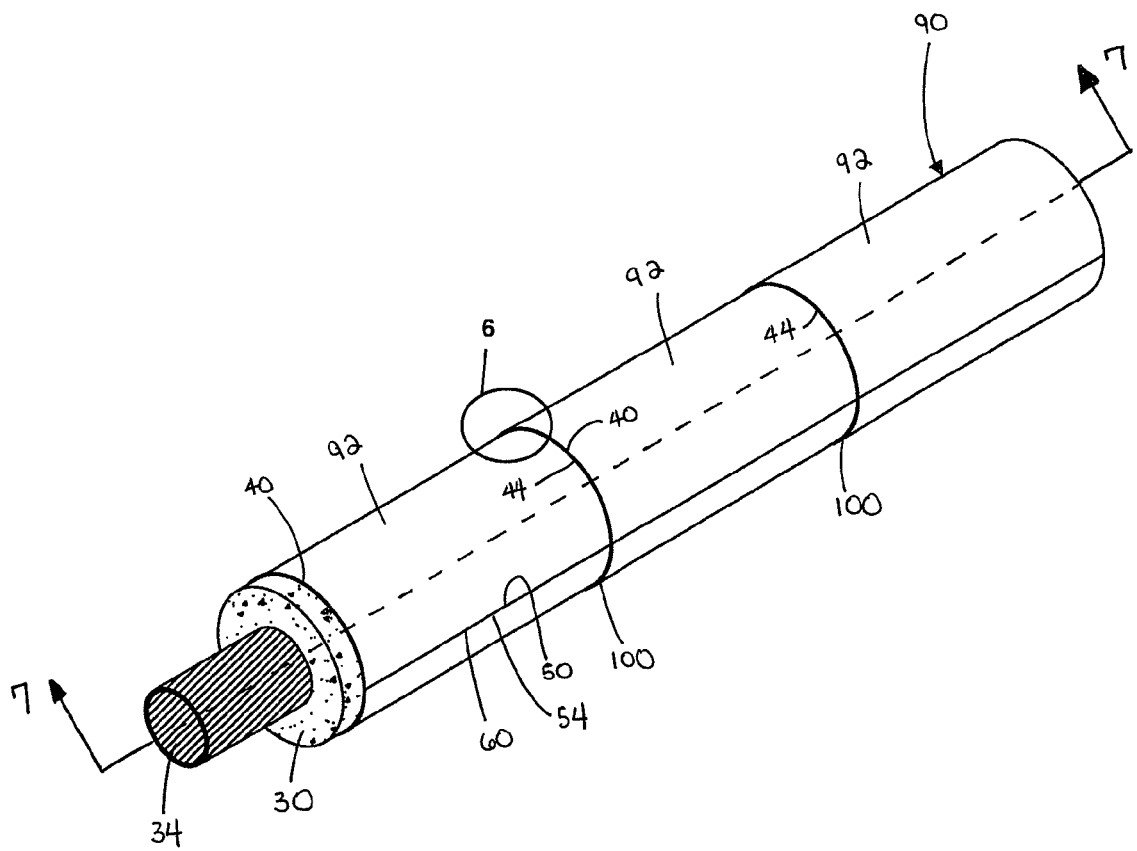
FIG. 5 is a perspective view of a section of an insulated conduit covered by another alternate embodiment of the adjustable jacket.
Figure 6:
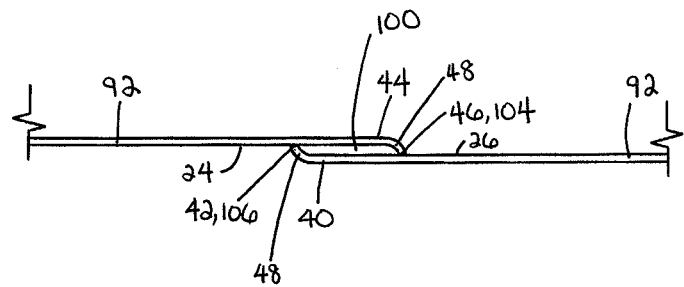
FIG. 6 is an enlarged detail view of the area circled in FIG. 5.
Figure 7:
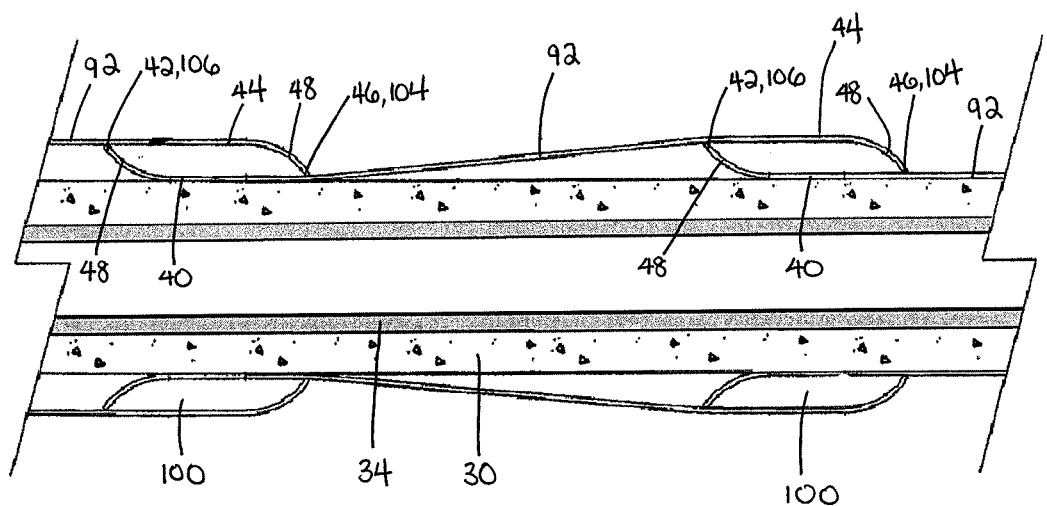
FIG. 7 is a fragmentary cross sectional view taken along line 7-7 of FIG. 5.

FIGS. 5-9 show another alternate embodiment of an adjustable jacket 90 according to the present application. As shown in FIG. 5, the adjustable jacket 90 includes a plurality of axial jacket sections 92. Each one of the plurality of axial jacket sections 92 includes inner and outer surfaces 24, 26, first and second axial ends 40, 44, and first and second longitudinal ends 50, 54 that each extends between the first and second axial ends 40, 44. The first and second longitudinal ends 50, 54 of each one of the plurality of axial jacket sections 92 form a longitudinal seal 60, as described above with respect to FIGS. 1-3. As shown in FIGS. 6 and 7, the second axial end 44 of a first one of the plurality of axial jacket sections 92 and the first axial end 40 of an adjacent one of the plurality of axial jacket sections 92 cooperate to form an axial seal 100. Like the longitudinal seal 60, the axial seal 100 also includes an outer seal 104 and an inner seal 106. The outer seal 104 is formed by a terminal edge 46 of the second axial end 44 of the first one of the plurality of axial jacket sections 92 in contact with the outer surface 26 of the adjacent one of the plurality of axial jacket sections 92. The inner seal 106 is formed by a terminal edge 42 of the first axial end 40 of the adjacent one of the plurality of axial jacket sections 92 in contact with the inner surface 24 of the first one of the plurality of axial jacket sections 92. As shown in FIGS. 5 and 7, the second axial end 44 of the adjacent one of the plurality of axial jacket sections 92 may form another axial seal 100 with another adjacent one of the plurality of axial jacket sections 92 in a similar manner as described above. Although the embodiment of the adjustable jacket 70 shown in FIGS. 5-9 is illustrated and described as having a plurality of axial jacket sections 92 that each includes a single longitudinal seal 60, one of ordinary skill in the art would appreciate that each one of the plurality of axial jacket sections 92 can also be formed from first and second sections 74, 76 that overlap to form first and second longitudinal seals 80, 82, as shown and described with respect to FIG. 4. Similarly, one of ordinary skill in the art would appreciate that this embodiment of the adjustable jacket 70 can be applied to an angled pipe bend, not only the straight section of pipe 34 shown in FIGS. 5-9.

Figure 8:
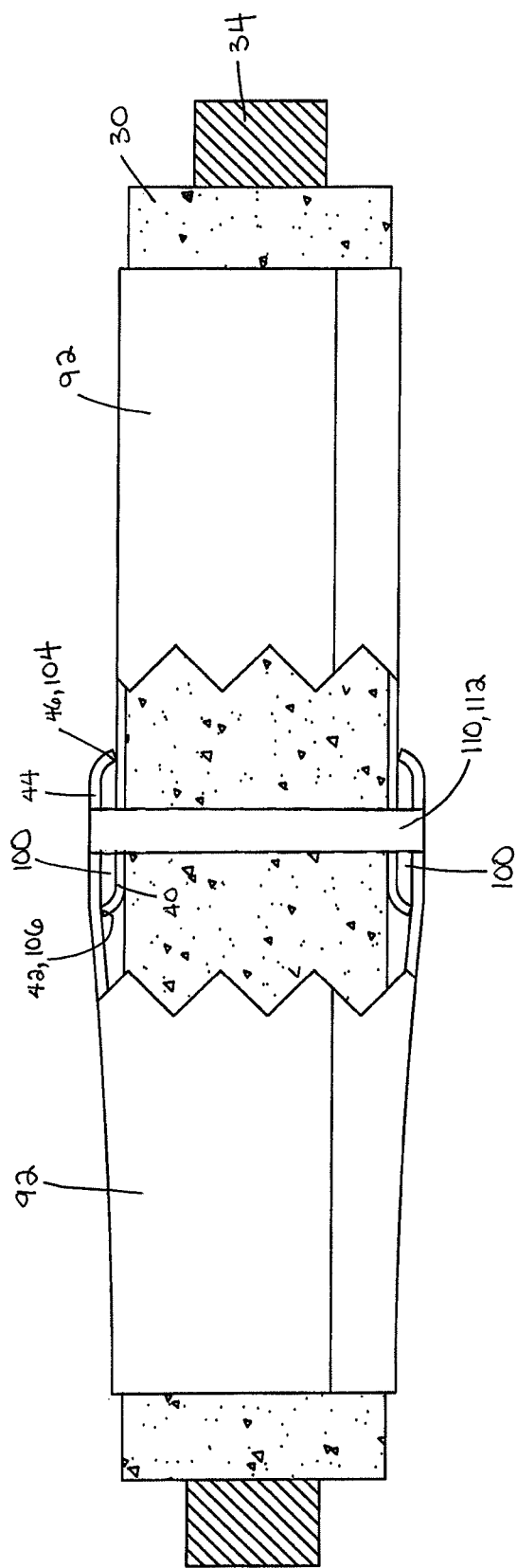
FIG. 8 is a fragmentary cross sectional view of the insulated conduit shown in FIG. 5, in which the axial seal is secured by a strap.
Figure 9:
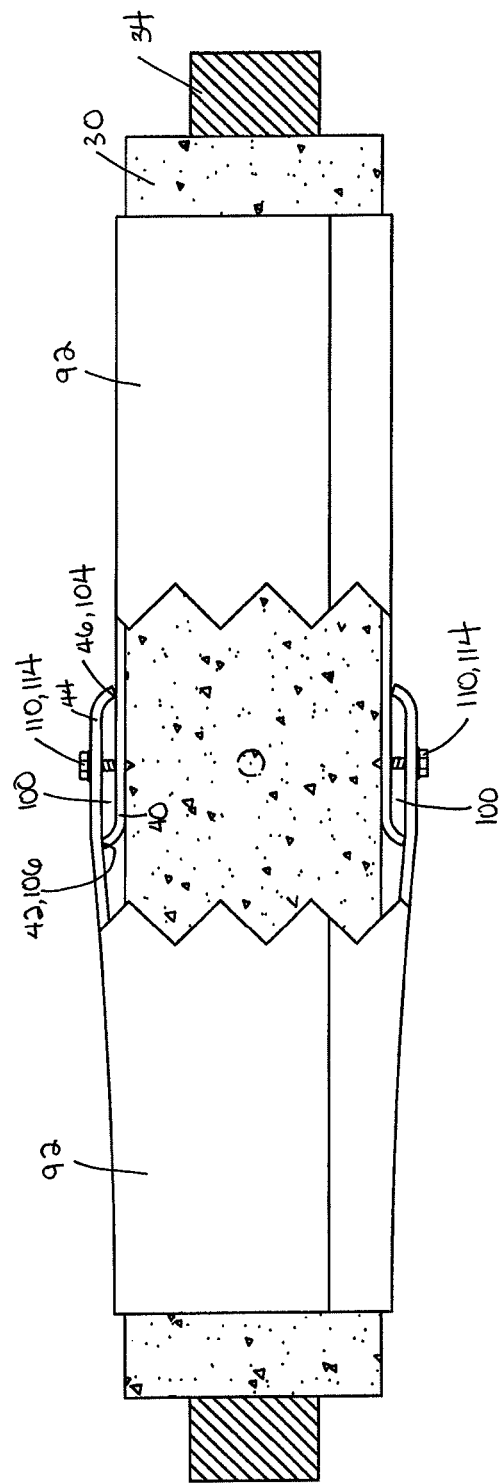
FIG. 9 is a fragmentary cross sectional view of the insulated conduit shown in FIG. 5, in which the axial seal is secured by a screw.

Preferably, the terminal edges 42, 46 of the first and second axial ends 40, 44 of each one of the plurality of axial jacket sections 92 are each formed as a flange 48 arranged at an angle with respect to the inner and outer surfaces 24, 26 of the plurality of axial jacket sections 92. The flanges 48 are most preferably formed at an acute or substantially perpendicular angle with respect to the underlying or overlying surface, so that the resulting axial seal 100 has the same advantages described above with respect to the longitudinal seal 60. Specifically, the focused and substantially perpendicular points of contact of the outer and inner seals 104, 106 minimizes the surface area of the jacket available to form adhesive forces with water, thus promoting non-wetting boundary conditions and deterring water from entering the axial seal 100 through capillary action. To further prevent water from entering the axial seal 100, the adjustable jacket 70 may also include a fastening element 110 arranged on the axial seal 100 to apply a compression force on the outer and inner seals 104, 106. The fastening element 110 can be any suitable mechanical fastener, adhesive, or other joining component. For example and without limitation, the fastening element 110 can be a strap 112 secured around a circumferential extent of the axial seal 100, as shown in FIG. 8. Alternatively, the fastening element 110 can be a screw 114 secured between the outer and inner seals 104, 106, as shown in FIG. 9. Although only two screws 114 are shown in the cross sectional view of FIG. 9, one of ordinary skill in the art would recognize that additional screws 114 can be placed along the circumferential extent of the axial seal, preferably at regular intervals, to further secure the axial seal 100. Although the fastening element 110 is being described with respect to the axial seal 100, one of ordinary skill in the art would recognize that a fastening element 110 can also be applied to the longitudinal seal 60 of the adjustable jacket 20 shown in FIGS. 1-3 or the first and second longitudinal seals 80, 82 of the adjustable jacket 70 shown in FIG. 4 to further prevent water from entering the adjustable jacket 20, 70.

Figure 10:
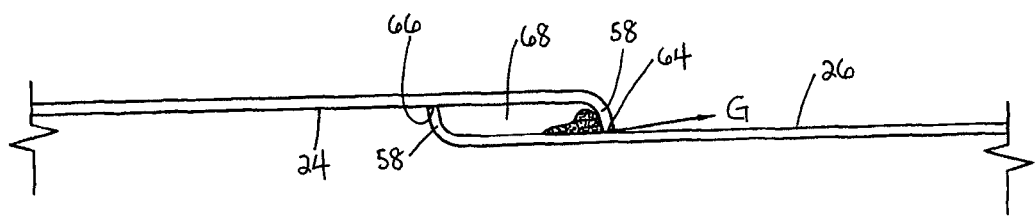
FIG. 10 is a fragmentary enlarged detail view of a seal of any one of the embodiments of the adjustable jacket, showing water trapped within the seal being expelled through gravity.

FIG. 10 shows an outer seal 64 and an inner seal 66 representative of either a longitudinal seal 60 or an axial seal 100 as described above. A space between the outer and inner seals 64, 66 acts as a channel 68 by which any condensation or water that penetrates the outer seal 64 can drain by gravity. The channel 68 between the outer and inner seals 64, 66 has a length defined by the distance between the outer and inner seals 64, 66 and a height defined by the height of the flanges 58 that form the outer and inner seals 64, 66. The length and height of this channel 68 can be selected to deter or prevent water from being trapped by capillary action between the parallel surfaces between the outer and inner seals 64, 66, because the distance between the solid surfaces interfacing with water is inversely proportionate to capillary strength. Therefore, by insuring a sufficient height of the flanges 58, any water that does breach the outer seal 64 and enter this channel 68 may be drained by gravity in the direction of arrow G in FIG. 10.

Figure 11:
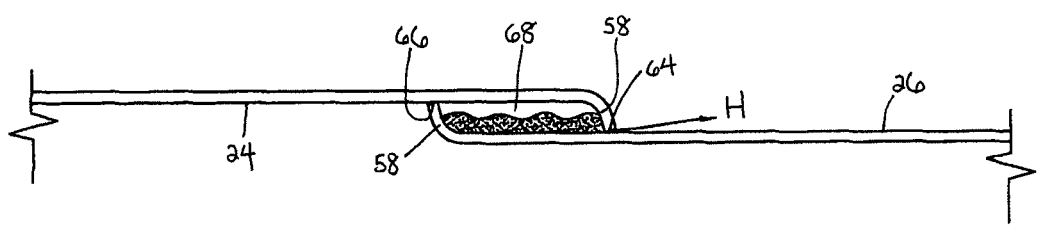
FIG. 11 is a fragmentary enlarged detail view of a seal of any one of the embodiments of the adjustable jacket, showing water trapped within the seal being expelled through hydrostatic pressure.

The focused and substantially perpendicular contact points of the outer and inner seals 64, 66, combined with the channel 68 between the outer and inner seals 64, 66, provide a two-seal system that is very difficult for liquid, such as moisture or water, to breach by capillary action. As discussed above with respect to the adjustable jacket 20 shown in FIGS. 1-3, the small contact point and substantially perpendicular orientation of the flange 58 that forms the outer seal 64 greatly minimizes the surface area of the jacket available to form adhesive forces with the liquid. However, weak capillary forces may still exist, and it is possible that liquid could breach the outer seal 64 under certain conditions. Given the large channel 68 between the outer and inner seals 64, 66 and the radially outward orientation of the flange 58 that forms the inner seal 66, it is very difficult for liquid to also breach the inner seal 66 through capillary action. As shown in FIG. 11, the contact point of the inner seal 66 between the flange 58 and the inner surface 24 of the jacket is radially outward of the contact point of the outer seal 64 (i.e., further away from the center of the jacket). Therefore, in orientations where gravity does not drain liquid from the channel (such as along the top longitudinal edge on the outer diameter of a pipe bend), liquid will have to accumulate within the channel 68 before it contacts the inner seal 66, as shown in FIG. 11. Given the aforementioned minimal adhesive and capillary forces present at the outer seal 64, the hydrostatic pressure of the liquid inside the channel 68 would be greater than the capillary pressure provided by the outer seal 64. Accordingly, the higher force of the hydrostatic pressure should force any liquid accumulated in the channel 68 out through the outer seal 64 in the direction of arrow H before the water reaches the level required to interface with the inner seal 66.

Figure 12A:
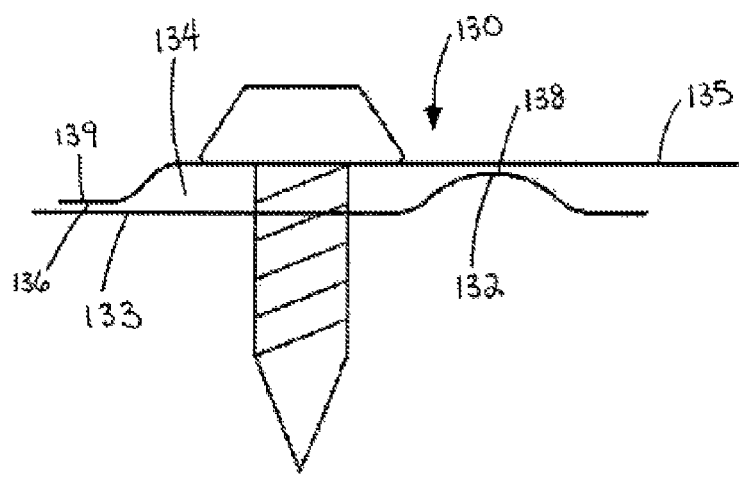
FIG. 12A is a fragmentary enlarged detail view of a known adjustable jacket seal.
Figure 12B:
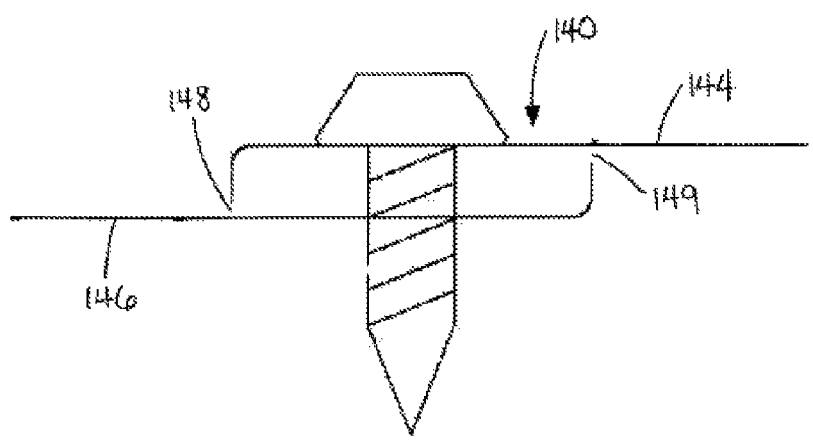
FIG. 12B is a fragmentary enlarged detail view of an axial seal of an adjustable jacket according to the present application having a substantially perpendicular bend angle.
Figure 12C:
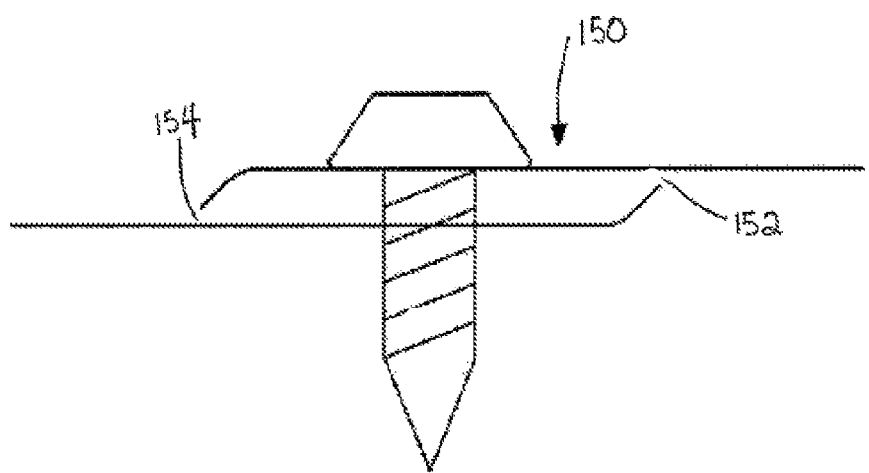
FIG. 12C is a fragmentary enlarged detail view of an axial seal of an adjustable jacket according to the present application having a substantially acute bend angle.
Figure 13:
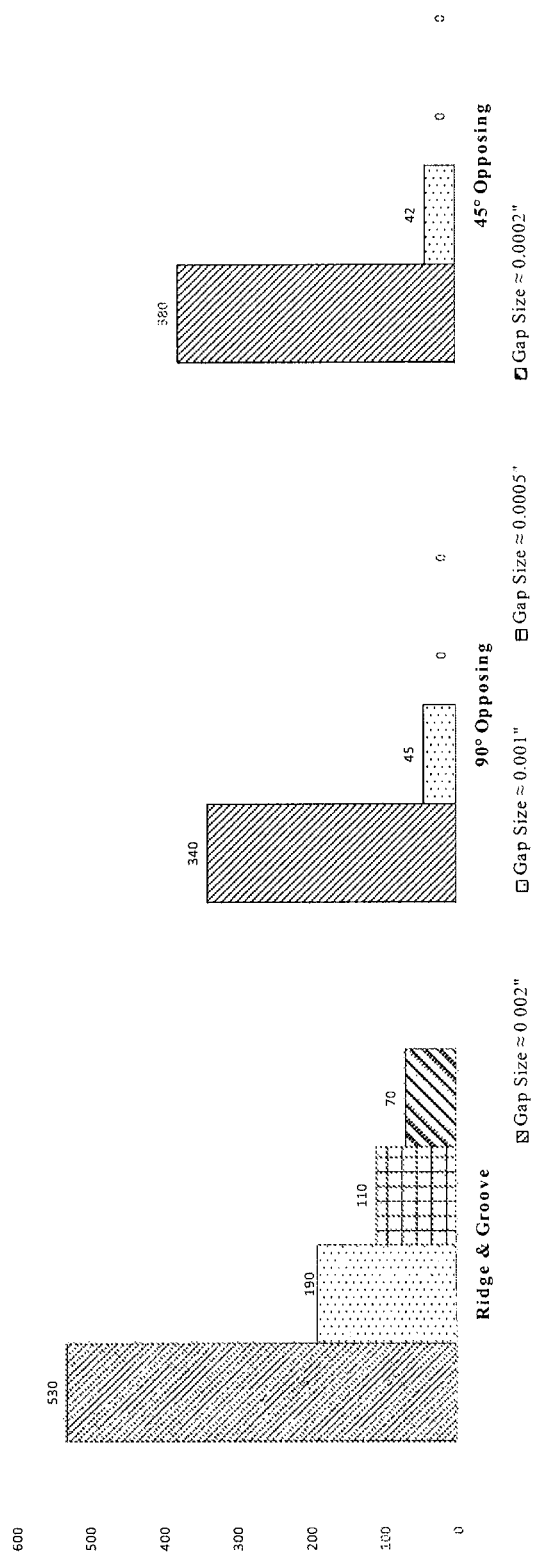
FIG. 13 is a graph comparing the remaining contents of the control group versus the test groups for varying gap widths.

As shown in FIG. 13 and the tables below, the seals of the present adjustable jacket can significantly reduce the amount of water that enters the jacket as compared with known single seal jackets and sliding adjustable seal jackets. Testing was conducted on three different types of seals, as shown in FIGS. 12A-12C, using two axial jacket sections that form an axial seal. The seal 130 shown in FIG. 12A is a "Ridge and Groove" seal, which forms the control group of the experiment. The Ridge and Groove seal 130 is a dual-seal adjustable seal that uses corresponding ridges and grooves, as described above in the Background section. When installed, a ridge 132 formed at the seam of the inside piece of jacketing 133 fits into a groove 134 formed on the overlapping outside piece of jacketing 135 to form an outside seal 136 and an inside seal 138. The outside seal 136 includes a tab 139 formed by a flat strip of jacketing along the longitudinal edge that is slightly depressed with respect to the rest of the outside piece of jacketing 135 and rests against the outer surface of the inside piece of jacketing 133.

Two test groups based on an adjustable jacket according to the present application were also tested in this experiment. The first test group is a "90° Opposing" seal 140 as shown in FIG. 12B, which is a dual-seal adjustable seal having opposing flanges that are formed along the seams of the outside piece of jacketing 144 and the inside piece of jacketing 146. The flange on the outside piece of jacketing 144 is bent inward at a 90° angle and contacts the outer surface of the inside piece of jacketing 146 to form an outer seal 148. Similarly, the flange on the inside piece of jacketing 146 is bent outward at a 90° angle and contacts the inner surface of the outside piece of jacket 144 to form an inner seal 149. The second test group is a "45° Opposing" seal 150 as shown in FIG. 12C, and includes inner and outer seals 152, 154 formed in the same manner as those of the 90° Opposing seal 140, except that the flanges are bent inward or outward at a 45° angle instead of a 90° angle.

Known jacket systems have gaps, however small, present along jacketing seams which allow water to penetrate the jacketing into the insulation system. An experiment was conducted to test the general hypothesis that the test groups' seals (FIGS. 12B and 12C) having opposing flanges would be more effective at resisting water intrusion than the seal of the control group (FIG. 12A). The jacket sections used in this experiment were made using aluminum alloy material currently used in the manufacturing of pressed aluminum jacketing. Specifically, 0.024" thick "Type 1100" aluminum alloy material with acrylic coating was used to form separate axial jacket sections having the seals shown in FIGS. 12A-12C. Each control and test group was made from identically sized inside and outside axial jacket sections, and flanges were manually formed with the use of a metal vise and basic metal-forming tools. Each flange of the test group seals was 3/32" in size. The "Ridge and Groove" seal 130 included flanges made using tooling designed by Sproule Manufacturing Corp. and used in their production line. A 3/32" drill bit was used to form two pilot holes for fastening screws on each axial jacket section at 3" centers and offset 5/16" from the beginning of the flange. A target area was marked at the center of each inside axial jacket section, 1" back from the outer seal, where a water stream would first contact the test sections. Each test jacket section was bent briefly over a cylinder with a 6" radius to place a mild curvature in the memory of the aluminum material.

A test stand was constructed on which the test jacket sections would be mounted for testing. The stand supports two arched ribs, each ¾" in width, spaced 3.5" apart and having a radius of 10" and covering an angle of 60°. A platform was placed below the ribs to support a collection container to capture water that penetrates the seal during testing. The test jacket sections were positioned on the stand by aligning the inside and outside jacket sections with respect to each other and then secured to the ribs using four snap clamps, one at each corner. Sheet metal screws (#6, ½" in length) were used to fasten the outside jacket section to the inside jacket section. Metal gap shims (¾"×1.5" in cross section and 0.020" thick) were placed in between the inside and outside jacket sections on each side of the seam, just outside of the fastener screw and over the top of the ribs. The fastening screws were tightened until the shims were snug, and the area of the seam between the fasteners was spot checked using a feeler shim. The fasteners were adjusted as required to ensure that the seals in each seam were appropriately spaced. The test stand was then placed in the center of a 62 L plastic open-top rectangular box, which was filled with approximately 24 L of water. A submersible, continuous-flow pump was placed in the water and connected by tubing to a nozzle (3/32" diameter outlet) placed on an adjustable stand. The nozzle was adjusted so that it was square to the seam of the test jacket sections, positioned 10" away, and at the same height as the test jacket sections. After the box and stand were leveled and the pump primed, the nozzle was aimed up or down so that it emitted a stream of water that contacted the test jacket sections at the pre-determined target area on the inside piece. The flow rate of the submersible pump was set at 700 mL/minute throughout the experiment. A 1200 mL plastic canister was placed on the platform underneath the test pieces to catch any water that penetrated the jacketing seam. Using a digital timer, the canister was positioned for a period of 1 minute and then removed and the contents measured. Volume was measured in milliliters to the nearest 10 mL, and if the total volume was under 100 mL, it was measured to the nearest 1 mL. Each control and test group was tested 5 times for each different gap width. Using shims of different thicknesses, the experiment was performed on each control and test group 5 times for gap widths of 0.020", 0.010", 0.005", and 0.002". Mean and standard deviations were calculated for each test group at each gap-thickness, and all means over 100 mL were rounded to the nearest multiple of ten. Statistic significance between test groups was calculated using a two-tailed ANOVA statistical evaluation for significance levers of $p \leq 0.001$. As shown in FIG. 13 and the tables below, the 90° Opposing seal 140 and 45° Opposing seal 150 of the test groups were significantly more effective at resisting water intrusion than the Ridge and Groove seal 130 of the control group.

TABLE 1

| | Gap Size ≈ 0.002" | | | | | | |
|---|---|---|---|---|---|---|---|
| Test Group | Trial 1 | Trial 2 | Trial 3 | Trial 4 | Trial 5 | Group Avg (mL) | St. Dev |
| Ridge & Groove | 540 | 520 | 520 | 560 | 510 | 530 | 20 |
| 90° Opposing | 340 | 350 | 340 | 330 | 340 | 340 | 7 |
| 45° Opposing | 380 | 390 | 360 | 390 | 380 | 380 | 12 |

TABLE 2

| | Gap Size ≈ 0.001" | | | | | | |
|---|---|---|---|---|---|---|---|
| Test Group | Trial 1 | Trial 2 | Trial 3 | Trial 4 | Trial 5 | Group Avg (mL) | St. Dev |
| Ridge & Groove | 190 | 180 | 190 | 200 | 190 | 190 | 7 |
| 90° Opposing | 48 | 42 | 46 | 46 | 44 | 45 | 2 |
| 45° Opposing | 42 | 44 | 40 | 38 | 44 | 42 | 3 |

TABLE 3

| | Gap Size ≈ 0.0005" | | | | | | |
|---|---|---|---|---|---|---|---|
| Test Group | Trial 1 | Trial 2 | Trial 3 | Trial 4 | Trial 5 | Group Avg (mL) | St. Dev |
| Ridge & Groove | 100 | 120 | 100 | 110 | 120 | 110 | 10 |
| 90° Opposing | 0 | 0 | 0 | 0 | 0 | 0 | 0 |
| 45° Opposing | 0 | 0 | 0 | 0 | 0 | 0 | 0 |

TABLE 4

| | | | Gap Size ≈ 0.0002" | | | | |
|---|---|---|---|---|---|---|---|
| Test Group | Trial 1 | Trial 2 | Trial 3 | Trial 4 | Trial 5 | Group Avg (mL) | St. Dev |
| Ridge & Groove | 60 | 80 | 80 | 70 | 60 | 70 | 10 |
| 90° Opposing | 0 | 0 | 0 | 0 | 0 | 0 | 0 |
| 45° Opposing | 0 | 0 | 0 | 0 | 0 | 0 | 0 |

As shown in the test data presented above, the 90° and 45° Opposing Seals 140, 150 of the test groups were both more effective than the Ridge & Groove seal 130 of the control group at each one of the gap widths. In fact, at gap widths of 0.0005" and 0.0002", the 90° and 45° Opposing Seal 140, 150 test groups both remained completely water resistant, whereas the Ridge & Groove Seal 130 control group experienced water intrusion into the jacket. During the experiment, it was observed that in the 90° and 45° Opposing Seal 140, 150 test groups, a substantial amount of water that intruded past the outer seal was repealed by the inner seal and then exited the jacketing by flowing out through the sides of the pieces in the channel created by the overlap.

A method of applying an adjustable jacket according to the present application around an insulated conduit is also disclosed. The method includes the step of providing a first adjustable jacket that includes inner and outer surfaces 24, 26, first and second axial ends 40, 44, and first and second longitudinal ends 50, 54 that each extends between the first and second axial ends 40, 44. As shown in FIG. 3, each one of the first and second longitudinal ends 50, 54 includes a terminal edge 52, 56 formed as a flange 58 arranged at an angle with respect to the inner and outer surfaces 24, 26 of the first adjustable jacket. The method further includes the steps of arranging the first adjustable jacket around an outer surface of an insulated conduit, and forming a longitudinal seal 60 by overlapping the first and second longitudinal ends 50, 54 such that the terminal edge 52, 56 of one of the first and second longitudinal ends 50, 54 is in contact with the outer surface 26 of the first adjustable jacket to form an outer seal 64, and the terminal edge 52, 56 of another one of the first and second longitudinal ends 50, 54 is in contact with the inner surface 24 of the first adjustable jacket to form an inner seal 66. Finally, the longitudinal seal 60 can be secured with a fastening element 110.

The method may further include the optional steps of providing each one of the first and second axial ends 40, 44 with a terminal edge 42, 46 formed as a flange 48 arranged at an angle with respect to the inner and outer surfaces 24, 26 of the first adjustable jacket, providing a second adjustable jacket identical to the first adjustable jacket, arranging the second adjustable jacket around the outer surface of the insulated conduit adjacent to the first adjustable jacket, and forming an axial seal 100 by overlapping the second axial end 44 of the first adjustable jacket with the first axial end 40 of the second adjustable jacket. The terminal edge 46 of the second axial end 44 of the first adjustable jacket contacts the outer surface 26 of the second adjustable jacket to form an outer seal 104, and the terminal edge 42 of the first axial end 40 of the second adjustable jacket contacts the inner surface 24 of the first adjustable jacket to form an inner seal 106. The method may also include the optional step of securing the axial seal 100 with a fastening element 110.

An alternate method of applying an adjustable jacket 70 according to the present application around an insulated conduit is also disclosed. The method includes the step of providing an adjustable jacket 70 having inner and outer surfaces 24, 26, a first section 74, and a second section 76. Each one of the first and second sections 74, 76 includes first and second axial ends 40, 44 and first and second longitudinal ends 50, 54 that each extends between the first and second axial ends 40, 44 and each includes a terminal edge 52, 56 formed as a flange 58 arranged at an angle with respect to the inner and outer surfaces 24, 26 of the adjustable jacket 70. The method further includes the steps of arranging the first section 74 of the adjustable jacket 70 over an outer surface of an insulated conduit, and arranging the second section 76 of the adjustable jacket over the outer surface of the insulated conduit such that the first and second sections 74, 76 of the adjustable jacket 70 form a circumferential extent around the outer surface of the insulated conduit. The method further includes the step of forming a first longitudinal seal 80 by overlapping the first longitudinal ends 50 of the first and second sections 74, 76 such that the terminal edge 52 of one of the first longitudinal ends 50 of the first and second sections 74, 76 is in contact with the outer surface 26 of the adjustable jacket 70 to form an outer seal 64, and the terminal edge 52 of another one of the first longitudinal ends 50 of the first and second sections 74, 76 is in contact with the inner surface 24 of the adjustable jacket 70 to form an inner seal 66. The method further includes the step of forming a second longitudinal seal 82 by overlapping the second longitudinal ends 54 of the first and second sections 74, 76 such that the terminal edge 56 of one of the second longitudinal ends 54 of the first and second sections 74, 76 is in contact with the outer surface 26 of the adjustable jacket 70 to form an outer seal 64, and the terminal edge of 56 of another one of the second longitudinal ends 54 of the first and second sections 74, 76 is in contact with the inner surface 24 of the adjustable jacket 70 to form an inner seal 66. The first and second longitudinal seals 80, 82 can be secured with a fastening element 110.

Various methods, configurations, and features of the present invention have been described above and shown in the drawings, one of ordinary skill in the art will appreciate from this disclosure that any combination of the above features can be used without departing from the scope of the present invention. It is also recognized by those skilled in the art that changes may be made to the above described methods and embodiments without departing from the broad inventive concept thereof.

What is claimed is:

1. An adjustable jacket for an insulated conduit, the adjustable jacket comprising:
   inner and outer surfaces;
   first and second axial ends; and
   first and second longitudinal ends that each extends between the first and second axial ends;
   wherein the first and second longitudinal ends form an adjustable longitudinal seal that is slidable in a circumferential direction, the longitudinal seal comprising an outer seal formed by a terminal edge of the first longitudinal end in contact with a portion of the outer surface of the adjustable jacket located circumferentially away from a terminal edge of the second longitudinal end, an inner seal formed by the terminal edge of the second longitudinal end in contact with a portion of the inner surface of the adjustable jacket located circumferentially away from the terminal edge of the first longitudinal end, and a channel having an adjustable volume is defined between a first circumferential extent defined at the first longitudinal end, a second circumferential extent defined at the second longitudinal end, the terminal edge of the first longitudinal end, and the terminal edge of the second longitudinal end, and a circumferential distance between the terminal edge of the first longitudinal end and the terminal edge of the second longitudinal end is adjustable.

2. The adjustable jacket of claim 1, wherein the terminal edges of the first and second longitudinal ends are each formed as a flange arranged at an angle with respect to the inner and outer surfaces of the adjustable jacket.

3. The adjustable jacket of claim 2, wherein the angle is an acute angle.

4. The adjustable jacket of claim 2, wherein the angle is substantially perpendicular.

5. The adjustable jacket of claim 2, wherein the outer seal is formed by the terminal edge of the first longitudinal end and the inner seal is formed by the terminal edge of the second longitudinal end, the terminal edge of the first longitudinal end being arranged substantially perpendicular to the outer surface of the adjustable jacket and the terminal edge of the second longitudinal end being arranged substantially perpendicular to the inner surface of the adjustable jacket.

6. The adjustable jacket of claim 2, wherein the outer seal is formed by the terminal edge of the second longitudinal end and the inner seal is formed by the terminal edge of the first longitudinal end, the terminal edge of the second longitudinal end being arranged substantially perpendicular to the outer surface of the adjustable jacket and the terminal edge of the first longitudinal end being arranged substantially perpendicular to the inner surface of the adjustable jacket.

7. The adjustable jacket of claim 2, wherein a terminal edge of each one of the first and second axial ends is formed as a flange arranged at an angle with respect to the inner and outer surfaces of the adjustable jacket.

8. The adjustable jacket of claim 7, wherein the terminal edges of the first and second axial ends are each adapted to cooperate with a terminal edge of an axial end of an adjacent adjustable jacket to form an axial seal having an inner seal and an outer seal.

9. An adjustable jacket for an insulated conduit, the adjustable jacket comprising inner and outer surfaces, a first section, and a second section, each one of the first and second sections comprising:

first and second axial ends; and first and second longitudinal ends that each extends between the first and second axial ends;

wherein the first longitudinal ends of the first and second sections form an adjustable first longitudinal seal that is slidable in a circumferential direction, and the second longitudinal ends of the first and second sections form an adjustable second longitudinal seal that is slidable in the circumferential direction, the first longitudinal seal comprising an outer seal formed by a terminal edge of one of the first longitudinal ends of the first and second sections in contact with a portion of the outer surface of the adjustable jacket located circumferentially away from a terminal edge of another one of the first longitudinal ends of the first and second sections, and an inner seal formed by the terminal edge of another one of the first longitudinal ends of the first and second sections in contact with a portion of the inner surface of the adjustable jacket located circumferentially away from the terminal edge of one of the first longitudinal seals of the first and second sections, a channel having an adjustable volume is defined between a first circumferential extent defined at the one of the first longitudinal ends of the first and second sections, a second circumferential extent defined at the another one of the first longitudinal ends of the first and second sections, the terminal edge of one of the first longitudinal ends of the first and second sections, and the terminal edge of the another one of the first longitudinal ends of the first and second sections, and a circumferential distance between the terminal edge of one of the first longitudinal ends of the first and second sections and the terminal edge of the another one of the first longitudinal ends of the first and second sections is adjustable, the second longitudinal seal comprising an outer seal formed by a terminal edge of one of the second longitudinal ends of the first and second sections in contact with the outer surface of the adjustable jacket, and an inner seal formed by a terminal edge of another one of the second longitudinal ends of the first and second sections in contact with the inner surface of the adjustable jacket.

10. The adjustable jacket of claim 9, wherein the terminal edges of the first and second longitudinal ends of the first and second sections are each formed as a flange arranged at an angle with respect to the inner and outer surfaces of the adjustable jacket.

11. The adjustable jacket of claim 10, wherein the angle is an acute angle.

12. The adjustable jacket of claim 10, wherein the angle is substantially perpendicular.

13. An adjustable jacket for an insulated conduit, the adjustable jacket comprising a plurality of axial jacket sections arranged adjacent to each other, each one of the plurality of axial jacket sections comprising:

inner and outer surfaces;

first and second axial ends; and first and second longitudinal ends that each extends between the first and second axial ends, the first and second longitudinal ends forming an adjustable longitudinal seal that is slidable in a circumferential direction;

wherein the second axial end of a first one of the plurality of axial jacket sections and the first axial end of an adjacent one of the plurality of axial jacket sections cooperate to form an axial seal, the axial seal comprising an outer seal formed by a terminal edge of the second axial end of the first one of the plurality of axial jacket sections in contact with a portion of the outer surface of the adjacent one of the plurality of axial jacket sections located circumferentially away from a terminal edge of the first axial end of the adjacent one of the plurality of axial jacket sections, an inner seal formed by the terminal edge of the first axial end of the adjacent one of the plurality of axial jacket sections in contact with a portion of the inner surface of the first one of the plurality of axial jacket sections located circumferentially away from the terminal edge of the second axial end of the adjacent one of the plurality of axial jacket sections, and a channel having an adjustable volume is defined between a first circumferential extent defined at the first axial end, a second circumferential extent defined at the second axial end, the terminal edge of the first axial end of the adjacent one of the plurality of axial jacket sections, and the terminal edge of the second axial end of the first one of the plurality of axial jacket sections, and a circumferential distance between the terminal edge of the first axial end of the adjacent one of the plurality of axial jacket sections and the terminal edge of the second axial end of the first one of the plurality of axial jacket sections is adjustable.

14. The adjustable jacket of claim 13, further comprising a fastening element arranged on the axial seal to apply a compression force on the inner and outer seals.

15. The adjustable jacket of claim 14, wherein the fastening element is a strap secured around a circumferential extent of the axial seal.

16. The adjustable jacket of claim 14, wherein the fastening element is a screw secured between the inner and outer seals.

17. The adjustable jacket of claim 13, wherein the terminal edge of the second axial end of a first one of the plurality of axial jacket sections and the terminal edge of the first axial end of an adjacent one of the plurality of axial jacket sections are each formed as a flange arranged at an angle with respect to the inner and outer surfaces of the plurality of axial jacket sections.

18. A method of applying an adjustable jacket around an insulated conduit, the method comprising the steps of:
providing a first adjustable jacket comprising inner and outer surfaces, first and second axial ends, and first and second longitudinal ends that each extends between the first and second axial ends and each includes a terminal edge formed as a flange arranged at an angle with respect to the inner and outer surfaces of the adjustable jacket;
arranging the first adjustable jacket around an outer surface of an insulated conduit;
forming an adjustable longitudinal seal that is slidable in a circumferential direction by overlapping the first and second longitudinal ends such that the terminal edge of the first longitudinal end is in contact with a portion of the outer surface of the adjustable jacket located circumferentially away from a terminal edge of the second longitudinal end to form an outer seal, and the terminal edge of the second longitudinal end is in contact with a portion of the inner surface of the adjustable jacket located circumferentially away from the terminal edge of the first longitudinal end to form an inner seal, parallel surfaces of the inner and outer seals defining a channel having an adjustable volume that is defined between a first circumferential extent defined at the first longitudinal end, a second circumferential extent defined at the second longitudinal end, the terminal edge of the first longitudinal end, and the terminal edge of the second longitudinal end, and a circumferential distance between the terminal edge of the first longitudinal end and the terminal edge of the second longitudinal end is adjustable; and
securing the longitudinal seal with a fastening element.

19. The method of claim 18, further comprising the steps of:
providing each one of the first and second axial ends of the first adjustable jacket with a terminal edge formed as a flange arranged at an angle with respect to the inner and outer surfaces of the first adjustable jacket;
providing a second adjustable jacket identical to the first adjustable jacket;
arranging the second adjustable jacket around the outer surface of the insulated conduit adjacent to the first adjustable jacket;
forming an axial seal by overlapping the second axial end of the first adjustable jacket with the first axial end of the second adjustable jacket such that the terminal edge of the second axial end of the first adjustable jacket is in contact with the outer surface of the second adjustable jacket to form an outer seal, and the terminal edge of the first axial end of the second adjustable jacket is in contact with the inner surface of the first adjustable jacket to form an inner seal; and
securing the axial seal with a fastening element.

20. A method of applying an adjustable jacket around an insulated conduit, the method comprising the steps of:
providing an adjustable jacket having inner and outer surfaces, a first section, and a second section, each one of the first and second sections comprising first and second axial ends, and first and second longitudinal ends that each extends between the first and second axial ends and each includes a terminal edge formed as a flange arranged at an angle with respect to the inner and outer surfaces of the adjustable jacket;
arranging the first section of the adjustable jacket over an outer surface of an insulated conduit;
arranging the second section of the adjustable jacket over the outer surface of the insulated conduit such that the first and second sections of the adjustable jacket form a circumferential extent around the outer surface of the insulated conduit;
forming a first adjustable longitudinal seal that is slidable in a circumferential direction by overlapping the first longitudinal ends of the first and second sections such that the terminal edge of one of the first longitudinal ends of the first and second sections is in contact with a portion of the outer surface of the adjustable jacket located circumferentially away from a terminal edge of another one of the first longitudinal ends of the first and second sections to form an outer seal, and the terminal edge of the another one of the first longitudinal ends of the first and second sections is in contact with a portion of the inner surface of the adjustable jacket located circumferentially away from the terminal edge of the one of the first longitudinal ends of the first and second sections to form an inner seal, parallel surfaces of the inner and outer seals define a channel having an adjustable volume that is defined between a first circumferential extent defined at the one of the first longitudinal ends of the first and second sections, a second circumferential extent defined at the another one of the first longitudinal ends of the first and second sections, the terminal edge of one of the first longitudinal ends of the first and second sections, and the terminal edge of the another one of the first longitudinal ends of the first and second sections, and a circumferential distance between the terminal edge of one of the first longitudinal ends of the first and second sections and the terminal edge of the another one of the first longitudinal ends of the first and second sections is adjustable;
forming a second longitudinal seal by overlapping the second longitudinal ends of the first and second sections such that the terminal edge of one of the second longitudinal ends of the first and second sections is in contact with the outer surface of the adjustable jacket to form an outer seal, and the terminal edge of another one of the second longitudinal ends of the first and second sections is in contact with the inner surface of the adjustable jacket to form an inner seal; and securing each one of the first and second longitudinal seals with a fastening element.

\* \* \* \* \*